R. A. NORLING.
CONNECTING ROD.
APPLICATION FILED MAY 22, 1920.
1,391,847.
Patented Sept. 27, 1921.
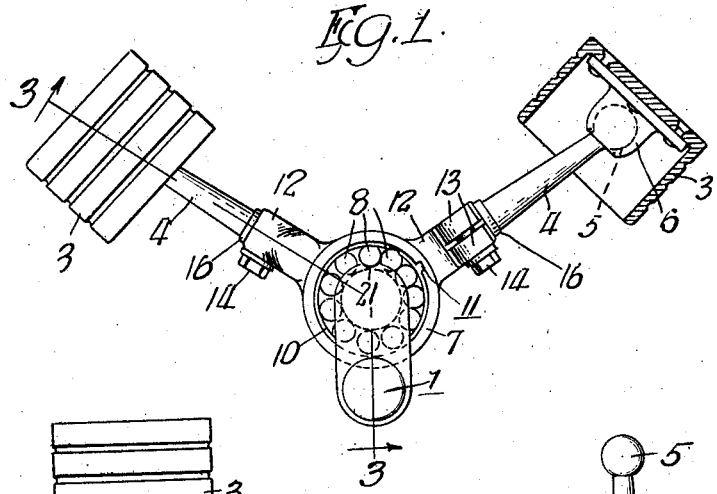
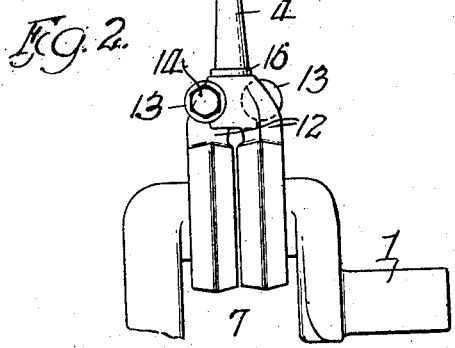
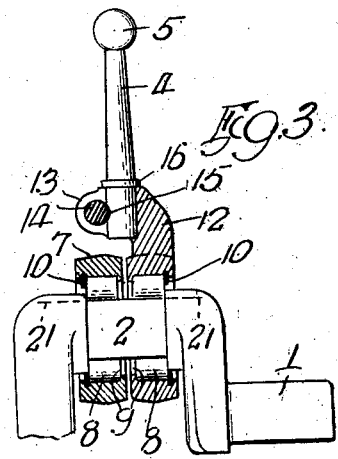
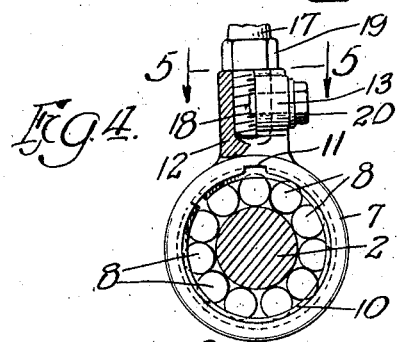
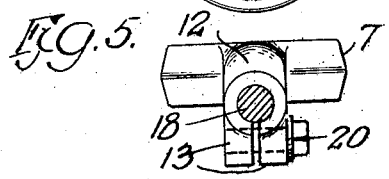
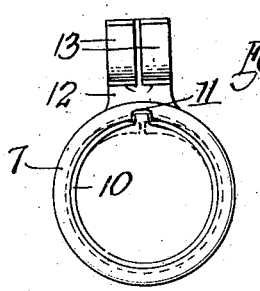
Inventor
Reinhold A. Norling

UNITED STATES PATENT OFFICE.

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE.

CONNECTING-ROD.

1,391,847.  Specification of Letters Patent.  Patented Sept. 27, 1921.

Application filed May 22, 1920. Serial No. 383,476.

*To all whom it may concern:*

Be it known that I, REINHOLD A. NORLING, a citizen of the United States, residing at Aurora, in the county of Kane and State of Illinois, have invented new and useful Improvements in Connecting-Rods, of which the following is a specification.

This invention relates to connecting rods for pneumatic motors such as are used in close quarter drills, portable power hoists, and other portable pneumatically operated tools wherein a motor having a crank shaft is used.

Among the objects of my invention is to provide the rod with a one-piece, continuous and unbroken bearing sleeve or ring about the crank pin, thus avoiding clamp screws and multiple parts and preventing the sleeve from being jarred or working loose on the crank pin by the vibrations to which the sleeve may be subjected during the operation of the motor. A further object is to so arrange the connection between the sleeves and pitmen that the latter are in the same plane. Another object is to provide a separate and distinct roller bearing for each sleeve so that each bearing roller is no longer than the width of its sleeve or ring and thus maintain the diameter of the bearing roller in proportion to its length to prevent the roller from being canted or displaced out of its rolling position and producing friction.

The invention consists further in the matters hereinafter described and more particularly pointed out in the appended claims.

In the accompanying drawings—

Figure 1 is a front view of two pistons, a crank shaft common thereto and connected therewith by connecting rods of my invention;

Fig. 2 is a side view of said parts;

Fig. 3 is a sectional view taken on the indirect line 3—3 of Fig. 1, with the piston omitted and showing one form of connection between the pitman and its bearing sleeve;

Fig. 4 is a view showing another form of such connection;

Fig. 5 is a horizontal sectional view taken on line 5—5 of Fig. 4; and

Fig. 6 is a side view of one of the bearing sleeves and showing how the bearing roller ring may be released from the race-way.

In the drawings, I have shown a crank shaft 1 of a pneumatic motor of the kind mentioned and having one or more crank pins 2, for each of which there are two pistons 3, 3 connected with the crank pin by the connecting rods of my invention. Each connecting rod has its pitman 4 provided at its outer end with a ball 5 received in a socketed member 6 secured to the inside of the piston head, as shown. At the opposite end of the pitman 4 is a one-piece continuous bearing sleeve or ring 7 surrounding the crank pin 2, there being two of said sleeves, arranged side by side, in the form of device shown. For each sleeve there is a separate and distinct roller bearing consisting of bearing rollers 8 retained in a race-way formed by a flange 9 on the sleeve at one side and a slip ring 10 at the oppostie side and releasably engaged in an annular groove in the sleeve. The sleeve has an outwardly opening notch 11 extending into the groove for the ring 10 and through which the ring may be reached by a suitable tool or instrument for contracting the ring and removing it from the groove, as shown in dotted lines in Fig. 6.

Each sleeve 7 has an outwardly projecting radial lug 12, integral therewith and provided with a radial socket to receive the inner end of the pitman 4. Said lug 12 is slit at the socket and on each side of the slot is an ear 13 projecting laterally therefrom over the associated sleeve 7 and engaged by a screw 14 to clamp the inner end of the pitman 4 in the socket, the inner end of the pitman, in the form shown in Figs. 1 to 3, having a transverse notch 15 to receive the screw, as shown in Fig. 3, to hold the pitman from being drawn out of the socket. The pitman has a collar 16 to seat against the lug 12 to position the pitman in its socket to register the notch 15 with the screw holes in the ears 13.

In Figs. 4 and 5, I have shown another way of connecting the pitman with the bearing sleeve. As illustrated, the pitman 17 is provided with a screw-threaded inner end 18 to be screwed into a screw-threaded socket in the lug 12 of the bearing sleeve 7. The pitman 17 has a collar 19, hexagonal to receive a wrench or other tool for screwing the pitman into the lug. This lug also has ears 13 engaged by a screw 20 to clamp the pitman 17 in the socket.

The crank arms at opposite ends of the pin 2 form annular shoulders to hold the roller bearings on the crank pin. These shoulders are on opposite sides of the sleeves and form end-thrust bearing surfaces for the outer ends of the bearing rollers of each sleeve. To permit the roller bearings to be applied to and removed from the pin 2, each crank arm is provided with a slot or groove 21, through which the roller bearing may be slipped when the ring 10 is off.

The bearing sleeve being in one-piece, continuous and unbroken, avoids the use of screws or like parts to clamp the sleeve about the crank pin, and thus there are no parts to loosen under the vibrations to which the sleeves are subjected when the motor is in use. Each bearing sleeve having a roller bearing separate and distinct from the one for the other sleeve, gives the bearing rollers a length no greater than the sleeve, thus maintaining the diameter of the rollers in the proper proportion to their lengths to prevent canting of the rollers or undue contact of one roller against the other. This, therefore, makes the bearing function properly and without undue friction. The lugs 12 extending in opposite directions and over the opposed sleeves, affords a connection of the pitmen allowing the latter to be in the same plane.

I claim as my invention:

1. The combination with a crank pin and two pistons working in cylinders on opposite sides of the crank pin and arranged at an angle to each other and in the same plane, of connecting rods connecting the pistons with the crank pin, each rod having a bearing sleeve surrounding said crank pin, and a separate and distinct roller bearing for each sleeve, said crank pin having end thrust surfaces on opposite sides of said sleeves, one for each roller bearing.

2. The combination with a crank pin and two pistons, of connecting rods connecting the pistons with the crank pin, each rod having a pitman and a one-piece continuous bearing sleeve surrounding the crank pin, a separate and distinct roller bearing for each sleeve, each sleeve having an integral radial lug extending over the opposite sleeve and having a socket to receive the inner end of the pitman, and means for clamping the pitman in its socket.

3. The combination with a crank pin and two pistons, of connecting rods connecting the pistons with the crank pin, each rod having a pitman and a one-piece continuous bearing sleeve surrounding the crank pin, a separate and distinct roller bearing for each sleeve, each sleeve having an integral radial lug extending over the opposite sleeve and having a socket to receive the inner end of the pitman with the longitudinal axis of the pitman in substantial alinement with the inner face of the associated sleeve, and means for clamping the pitman in its socket.

4. The combination with a crank pin and two pistons working in cylinders on opposite sides of the crank pin and arranged at an angle to each other and in the same plane, of connecting rods connecting the pistons with the crank pin, each rod having a pitman and a bearing sleeve surrounding said crank pin, said bearing sleeves being arranged side by side and each connected with its pitman with the longitudinal axis of the pitman in substantial alinement with the inner face of the sleeve, each sleeve having a race-way for bearing rollers, and said crank pin having end thrust surfaces on opposite sides of said sleeves, one end thrust surface for the outer ends of the bearing rollers of each sleeve.

5. The combination with a crank pin and two pistons working in cylinders on opposite sides of the crank pin and arranged at an angle to each other and in the same plane, of connecting rods connecting the pistons with the crank pin, each rod having a pitman and a one-piece continuous bearing sleeve surrounding said crank pin, said bearing sleeves being arranged side by side and each having a radial lug extending over the opposite sleeve and having a socket to receive the inner end of the pitman with the longitudinal axis of the pitman in substantial alinement with the inner face of the associated sleeve, means for clamping the associated sleeve, means for clamping the pitman in its socket, each sleeve having a race-way for bearing rollers, and said crank pin having end thrust surfaces on opposite sides of said sleeves, one end thrust surface for the outer end of the bearing rollers of each sleeve.

6. The combination with a crank pin and two pistons working in cylinders on opposite sides of the crank pin and arranged at an angle to each other and in the same plane, of connecting rods connecting the pistons with the crank pin, each rod having a pitman and a bearing sleeve surrounding said crank pin, said bearing sleeves being arranged side by side and each connected with its pitman with the longitudinal axis of the pitman offset inwardly from the center of the width of the sleeve, each sleeve having a race-way for bearing rollers, and said crank pin having end thrust surfaces on opposite sides of said sleeves, one end thrust surface for the outer end of the bearing rollers of each sleeve.

7. The combination with a crank pin and two pistons working in cylinders on opposite sides of the crank pin and arranged at an angle to each other and in the same plane, of connecting rods connecting the pistons with the crank pin, each rod having a pitman and a bearing sleeve surrounding said crank pin, said bearing sleeves being arranged side by side and each connected with its pitman with the longitudinal axis of the pitman offset inwardly from the center of the width of the sleeve, each sleeve having an inwardly extending annular flange at its inner side, bearing rollers between the crank pin and each sleeve and having their inner ends against said flange, and said crank pin having end thrust surfaces on opposite sides of said sleeves, one end thrust surface for the outer ends of the bearing rollers of each sleeve.

8. A connecting rod, comprising a pitman having a one-piece continuous bearing sleeve at one end, said sleeve having a radial lug provided with a split socket to receive the inner end of the pitman, said pitman having a shoulder adjacent its inner end to seat against said lug, said lug having ears on opposite sides of the severed socket, and a clamp screw engaging said ears to clamp the pitman in said socket.

9. A connecting rod, comprising a pitman having a one-piece continuous bearing sleeve at one end, said sleeve having a radial lug provided with a split socket with internal screw threads to receive the threaded inner end of the pitman, said pitman having a shoulder adjacent its inner end to seat against said lug, said lug having ears on opposite sides of the severed socket, and a clamp screw engaging said ears to clamp the pitman in said socket.

In testimony that I claim the foregoing as my invention, I affix my signature this 17 day of May, A. D. 1920.

REINHOLD A. NORLING.